Figure 1:
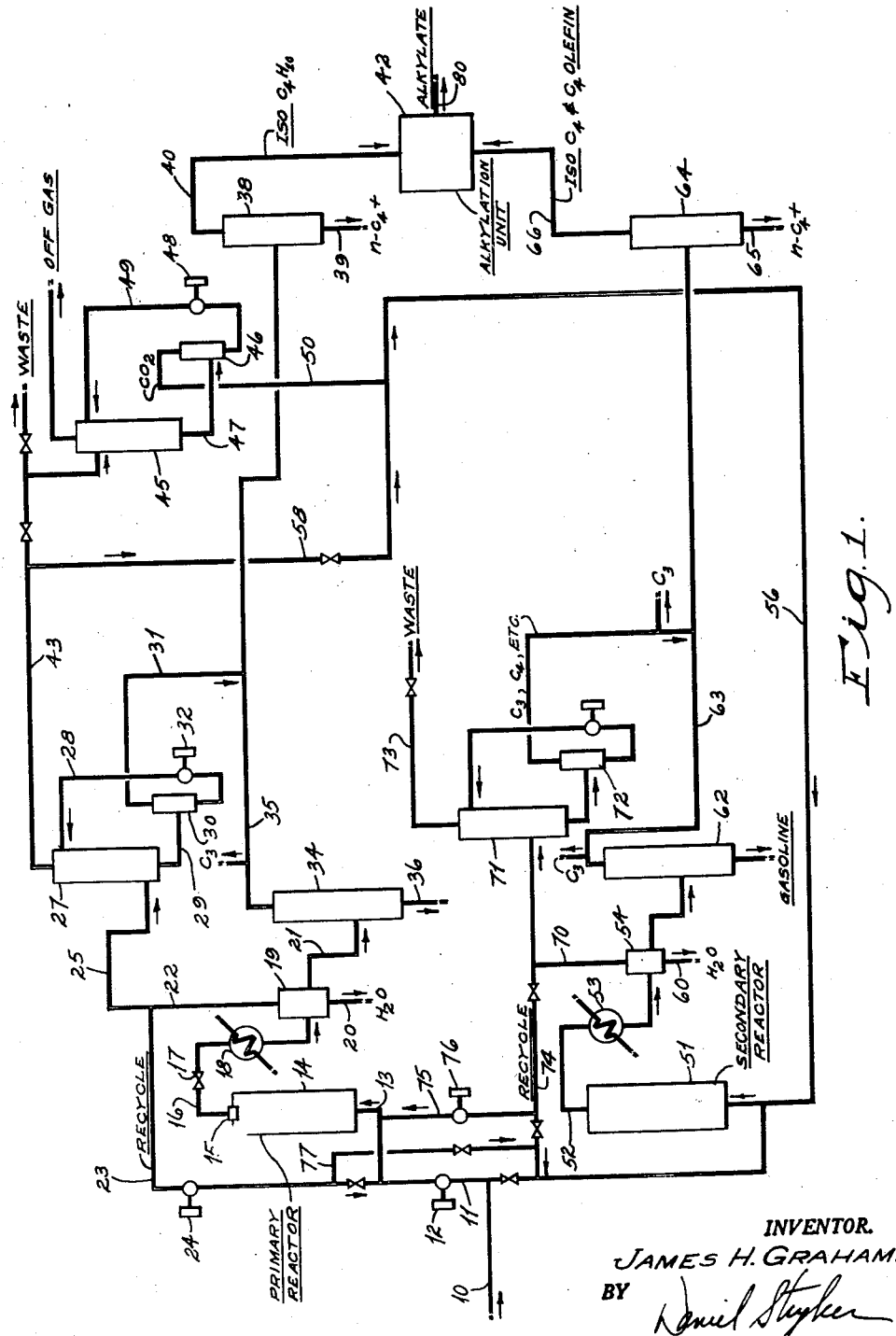

Patented Apr. 11, 1950

2,503,724

UNITED STATES PATENT OFFICE 2,503,724

SYNTHESIS OF HYDROCARBONS

James H. Grahame, Mount Vernon, N. Y., assignor to Texaco Development Corporation, New York, N. Y., a corporation of Delaware Application April 16, 1947, Serial No. 741,867

9 Claims. (Cl. 260—449.6)

The present invention is concerned with the production of hydrocarbons, oxygenated, hydrocarbons, and the like by the catalytic reduction of carbon monoxide with hydrogen, and more specifically involves the correlated and predetermined production and use of inevitable accompanying gaseous products of reaction, to improve and supplement the production of liquid hydrocarbons, particularly those boiling in the motor gasoline boiling range.

In accordance with the present invention, hydrogen and carbon monoxide are converted catalytically in a primary reaction zone in which operating conditions are directed for the production of branched chain aliphatic hydrocarbons together with relatively large amounts of by-product carbon dioxide. Normally liquid fractions are recovered as a product stream and the residual gases, such as carbon dioxide and unreacted hydrogen, are supplied to a secondary synthesis reaction zone where they are mixed with additional hydrogen and carbon monoxide and catalytically treated under typical reaction conditions adapted to produce predominantly liquid hydrocarbons largely or essentially of olefinic character. Gaseous olefins accompanying the reaction product, together with isobutane and if desired isopentane from the first reaction zone are submitted to alkylation for the production of a high quality motor gasoline fraction.

Typical processes for the synthesis of hydrocarbons currently proposed, involve passage of a synthesis gas comprising hydrogen and carbon monoxide in contact with a synthesis catalyst at elevated temperature and usually at elevated pressure with recovery of the desired hydrocarbons from the gasiform reaction products. The usual process employs a catalyst comprising a metal of the iron group or ruthenium, together with small additions of an activator and promoter such as oxides of alkali metal or alkaline earth metals, titanium, zirconium, thorium, alumina and many others. Temperatures vary with the specific catalyst selected and are usually about 400° F. or above in the case of the cobalt catalyst.

Many advantages, however result from the use of an iron catalyst preferably in a condition of fluidization and at temperatures from about 550 to 700° F., preferably about 600° F. and under an elevated pressure from 150 to 300 pounds per square inch gauge. The products tend to be olefinic in character and thus the appropriate fractions provide a good motor gasoline fuel.

On the other hand, it is possible to carry out the catalytic reduction of carbon monoxide and hydrogen for the production largely or essentially, of isoparaffins.

This isoparaffin synthesis process employs apparatus which is generally equivalent to that usually employed in the first mentioned process and depends upon the action of somewhat different catalysts which have a specific selective action in promoting the formation of the aforementioned isoparaffins. Typical isoparaffin synthesis catalysts are a composite alumina-thoria catalyst or a zinc oxide-alumina catalyst, which are operable usually under characteristic elevated temperatures in the range of about 750–900° F. or more specifically in the range of about 785° F. to 840° F. Operating pressure is usually substantial, usually in the range of from 50 to 500 atmospheres, and preferably about 300 to 500 atmospheres.

The present invention, however, is not concerned, per se, with the specific catalyst or reaction conditions, and contemplates all equivalent catalysts actively effective to promote the selective formation of isoparaffins when operating under appropriate reaction conditions.

The isoparaffin synthesis process normally results in the production of relatively large amounts of by-product carbon dioxide with corresponding loss of yield of hydrocarbons on the basis of carbon supplied to the system. Substantial formation of carbon dioxide is moreover accomplished with a relatively low consumption of hydrogen.

In accordance with the present invention product gases from the primary reaction zone, particularly the by-product carbon dioxide and hydrogen, are supplied to the secondary reaction zone, together with the fresh feed synthesis gas therein reacted, to control the reaction and effect a desirable consumption of these constituents in the formation of additional hydrocarbon product.

The invention has the valuable advantage of permitting the direct production of isoparaffins without the disadvantage of excessive loss of feed carbon to carbon dioxide. This follows because of the fact that the excess carbon dioxide will suppress formation of carbon dioxide in the catalytic synthesis of olefinic and paraffinic hydrocarbons, as disclosed in the co-pending application, Serial No. 630,521, filed November 23, 1945 in the name of Claude W. Watson. Moreover, as further shown in this co-pending application, an actual predetermined net consumption of carbon dioxide may be effected in the production of additional hydrocarbons. Reference is made to this co-pending application for all details of the process in question.

The invention has the further advantage of providing a correlated feed of isoparaffins and olefins containing four carbon atoms or thereabout, suitable for an alkylation charge stock. The normally liquid products of reaction are usually accompanied by such fractions in quite substantial excess of over the amount which may be used to pressure the motor gasoline fractions; that is, which may be included in the commercial motor gasoline product as a desirable component, contributing to volatility, and anti-knock properties, and correspondingly swelling the volume production. The present invention segregates normal butane for this purpose, whereby $C_4$ hydrocarbons suitable for alkylation, are so utilized, and only the normal butane becomes a blending agent in the product gasoline. Additionally, the return of normal light gaseous hydrocarbons selectively to the synthesis reaction zone or zones in substantial quantity tends to restrict and suppress net formation thereof to usable quantities.

Figure 2:
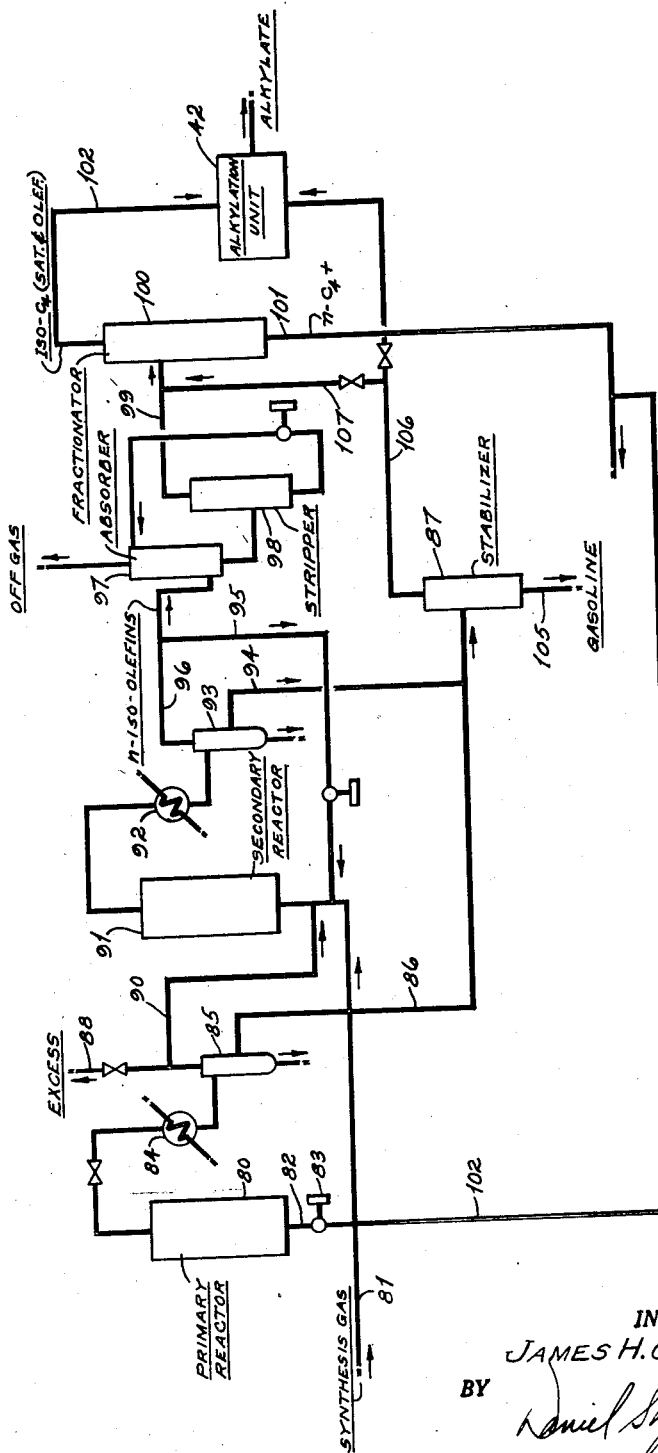

In order to more clearly describe the invention with reference to one specific embodiment thereof, reference is had to the accompanying drawing wherein Figure 1 represents more or less diagrammatically one preferred arrangement, and Figure 2 discloses an alternative preferred process.

Referring to Figure 1 of the drawing, the numeral 10 designates an inlet line supplying a fresh feed synthesis gas from any suitable source, not shown, and comprising essentially hydrogen and carbon monoxide in suitable relative proportions. This stream passes into a header 11 where it is split, the upper flow passing by way of a pump 12, and a branch pipe 13 to the lower portion or inlet of a primary reaction zone designated by the numeral 14.

The reaction zone 14 has been designated only symbolically because of the wide variety of conventional forms it may take. Most advantageously, operation is carried out with an upstanding tubular reactor in which an isoparaffin synthesis catalyst is held in the form of a powder maintained in a state of dense phase fluidization by the upflowing reactants. Temperature control may be maintained by means of suitable cooling surfaces immersed in the catalyst mass in the usual manner and held by means of a suitable coolant at an appropriate temperature level.

The effluent gasiform reaction products, after appropriate contact with the catalyst emanate from the upper pseudo-liquid level of the fluidized mass and pass through filter 15 or any other suitable separator of the cyclone, electrostatic or other type through outlet conduit 16. Throttle valve 17 in conduit 16 permits pressure reduction from the high pressures prevailing in the reaction zone 14. The products, at a lower preselected pressure, as for example 200 pounds per square inch, pass through condenser 18 to separator 19 from which condensed water vapor is removed as at 20 and normally liquid hydrocarbon fractions are withdrawn as at 21. Normally gaseous overhead from the separator is withdrawn through pipe 22 and may be recycled, in part, to the reaction zone inlet by way of branch pipe 23, and pump 24.

The residual overhead gases are conducted by branch pipe 25 to a further recovery means, which, in the present instance, takes the form of an absorption system effective to recover $C_4$ fractions. To this end, the gaseous stream enters a stripping tower 27 supplied at its upper portion with a stream of suitable lean oil from pipe 28. The downflow of lean oil absorbs $C_4$ hydrocarbons and is ultimately withdrawn as at 29 to stripping tower 30 from which the stripped hydrocarbon gases pass overhead as at 31, and the stripped lean oil is returned to pipe 28 by pump 32.

Additional $C_4$ hydrocarbons are recovered from stabilizer 34 which receives the normally liquid fraction of pipe 21 aforementioned and delivers the $C_4$ fractions thereof through overhead pipe 35. The residue discharged to 36 comprises the higher hydrocarbons and any included normally liquid oxygenated hydrocarbons which may be subjected to any desired further treatment or use.

The light hydrocarbons rich in isoparaffins in conduit 31 are combined with those in conduit 35 and pass to a fractionation tower 38 from which a separation is made between normal paraffins discharged as at 39, and an overhead of essentially light isoparaffins, together with any contained olefins discharged as at 40. Pipe 40 leads to an alkylation system to be hereinafter referred to in greater detail.

The off gases or overhead from the absorption tower 27 comprising essentially carbon dioxide, light hydrocarbon gases, and unreacted carbon monoxide and hydrogen, pass through pipe or conduit 43 to a carbon dioxide recovery system, including an absorption tower 45 and a stripper 46. This gas recovery unit, the details of which form, per se, no part of the present invention, may comprise any conventional means for the separation of carbon dioxide, such as the Girbotol system wherein an absorbent such as triethanolamine passes downwardly through the absorption tower, is removed as at 47, stripped of carbon dioxide in the tower 46, and returned to the absorption tower by way of pump 48 and conduit 49. Separated carbon dioxide comes overhead by way of pipe 50.

The remainder of the synthesis gas in the header 11 passes into secondary reactor 51 operating for the production of largely and predominantly olefin hydrocarbons. The form and arrangement of this reaction zone may be substantially identical with that disclosed in connection with the primary reactor 14 or alternatively it may take the form of any other conventional hydrocarbon synthesis reactor. Herein the fresh synthesis gas is passed, for example, upwardly through a fluidized mass of catalyst in the secondary reactor, at an elevated pressure and temperature, and the reaction products are withdrawn through conduit 52 to condenser 53 and separator 54.

Attention is particularly directed to the fact that the recovered carbon dioxide from pipe 50 is directed through branch pipe 56 to the inlet of the reactor 51 as a supplementary feed. So also it is particularly important to note that valved conduit 58 connects the aforementioned pipe 43 and pipe 56 so that stripped, normally gaseous reaction products from the primary or isoparaffin synthesis step can be included in the pipe 56 stream to the secondary reactor in any desired proportion. Obviously this affords a convenient means for adjusting the total feed to the last named reactor to the desired relative proportion of carbon dioxide, hydrogen, gaseous hydrocarbons, and the like, so that the reaction occurs under conditions favorable to the desired utilization of hydrogen and carbon dioxide in the formation of olefinic type liquid hydrocarbons, and the maximum suppression of light hydrocarbon gas formation.

By-product water is discharged from separator 54 as at 60 the liquid hydrocarbon layer passing by way of pipe 61 to stabilizer 62. The overhead from stabilizer 62, comprising essentially olefins suitable for alkylation, passes by way of pipe 63 to a fractionator 64 operating to remove normal butane as at 65, and deliver the olefins and contained isoparaffins, if any, to the alkylation unit 42 through pipe 66.

Additional alkylation stock is obtained from the gaseous overhead of separator 54 withdrawn through pipe 70 to an absorption system identical with that used to treat the normally gaseous products from the primary reactor and comprising an absorber 71 and a stripper 72. The fractions stripped from the adsorbent liquid comprise suitable olefin alkylation stock, preferably butylenes. These are intermingled with the product of pipe 63 and treated to remove normal paraffins in the fraction system 64, previously referred to.

Stripped gas from the absorber 71 is discharged through pipe 73 for further treatment, recovery or use as fuel, or conversion to additional synthesis gas as may be desired.

Suitably valved branch pipe 74 connects pipe 70 and header 11 to permit recycle of wet products of reaction to the reactor 51 as desired.

From the foregoing, it will be apparent that in the present process, coordinated reactors, operate respectively for the production of isoparaffinic and olefinic hydrocarbons from which liquid hydrocarbon fractions are recovered, and the normally gaseous isoparaffins and olefins are supplied in predetermined proportion to an alkylation system 42 supplying alkylate as at 80.

The invention particularly contemplates operation of the olefin forming synthesis step under conditions adapted to result in appropriate utilization of excess carbon dioxide as previously mentioned. While approach to this desirable condition is afforded simply by supplying the available streams of carbon dioxide and hydrogen to the reactor, the desired condition may be controllably effected by correlating the various feed streams to the reactor 51 as disclosed in aforementioned copending application Serial No. 630,521, so that the composition of the total feed meets the conditions specified therein and to which reference is hereby made.

Essentially however the total feed to the reactor is adjusted so that the molar ratio of the H to CO is 2:1 or preferably greater and the proportion of $CO_2$ is raised to a value where the desired suppression or consumption of $CO_2$ occurs. Preferably the total molar proportion of $H_2$ is not greater than the sum of twice the molar proportion of CO plus three times the molar proportion of $CO_2$ in the total feed. Formularized, this means that the ratio of $H_2$ to $2CO$ plus $3CO_2$ is less than about 1:1. Advantageously it is not below about 0.6:1.

In addition for net carbon dioxide consumption in the secondary reaction zone, it is contemplated maintaining the molar ratio:

$$\frac{CO_2(H_2-2COA)}{CO \times H_2O}$$

of the reactants passing to the reaction zone substantially greater than the numerical value of the equilibrium constant for the water gas shift reaction at the temperature prevailing in that reaction zone, where:

A is the fraction of the carbon monoxide which will be converted in that stage. Such fraction may range from 0.90 to 0.995 for example. The equilibrium constant K for the water gas shift reaction can be expressed as:

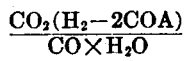

where:

$e$ is the base of Naperian logarithms e. g. 2.7183, and T is the reaction temperature in degrees F. The value of K ranges from 70 for a reaction temperature of about 500° F. to a value of about 16 for a reaction temperature of about 700° F. and is about 31 for a reaction temperature of about 600° F.

In general the magnitude of the net consumption of carbon dioxide increases with the excess of the above molar ratio, over the value of K.

Under these conditions, it is possible to consume all or substantial portions of the carbon dioxide available.

It is to be understood that the specific absorption fractionation and stabilizing arrangements disclosed may be substituted by any equivalent means capable of producing an equivalent separation. Moreover, the invention fully contemplates the treatment of equivalent streams in a suitable common separation system. For example, the wet product gases from the separators 19 and 54 may be treated by common absorption or fractionation means, and similarly the respective liquid streams therefrom may be stabilized in a single stabilizing means, the combined alkylation charge stock passing in admixture to the alkylation unit.

In addition, the invention contemplates the recovery of olefins by absorption in a suitable acid stream forming a part of the alkylation system. For example, any suitable olefinic fraction from the secondary reaction zone may be passed into a suitable stream of sulphuric acid in an absorber and the withdrawn acid, containing absorbed olefins, passed directly to the alkylation reactor where it is contacted with the isoparaffin stream, in the usual manner. So also the product of the alkylation zone may be subjected to separation and the recovered acid recycled to the absorber in the usual manner.

It is important also to note that the present invention contemplates interexchange of recycle streams between the two reaction zones in such a manner as to permit additional adjustment of the respective total feeds. To this end, conduit 75 and pump 76 direct recycle stock from the line 74 to the inlet pipe 13 of reactor 14 as required. Conversely, valved branch pipe 77 permits recycle stock from line 23 to be controlledly supplied to reactor 51.

In accordance with a modified process shown in Figure 2, a primary reaction zone 80 which may be the same as above, is supplied with synthesis gas through inlet pipe 81, branch pipe 82 and pump 83, and the products of reaction pass, preferably at a lower pressure, through condenser 84 and separator 85. The liquid hydrocarbon layer passes by way of pipe 86 to stabilizer 87. Tail gas from the separator 85, subject to recycle of any portion and to venting through branch pipe 88, as desired for purposes of control, is passed directly through pipe 90 into the inlet of the secondary reaction zone 91, together with additional synthesis gas from inlet manifold 81.

Reaction products from the secondary reactor are thereafter condensed as at 92 and separated as at 93, the liquid oily layer passing by way of pipe 94 to the aforementioned pipe 86 and the stabilizer 87. Return line 95 permits recycle of any desired portion of the separated normally gaseous products of reaction to the reactor. Residual tail gas from pipe 96 flows to a separation system of the character described above, comprising an absorber 97, in which a suitable liquid absorbent takes up $C_4$ hydrocarbons, and is stripped in tower 98. The off gas from the absorber 97 comprises any residual unreacted feed gas, inerts, light hydrocarbon gases and the like, and may be returned, if necessary, to control the feed to either or both of the reaction zones. The stripped gases pass through pipe 99 to a fractionation system 100 operating to remove normal butane as at 101 and deliver a stream of isobutane and butylene through pipe 102 to the alkylation unit 42.

Stabilizer 87 delivers through outlet 105 a normally liquid stream which may be a motor gasoline product. It also delivers an overhead stream of $C_4$ hydrocarbons thru pipe 106, to the alkylation plant as shown. Alternatively this stream may pass through valved branch line 107 to the inlet 89 of the fractionator 100.

As indicated diagrammatically, the normal butane in line 101 may be used to pressure the motor gasoline fractions which constitute or are included in the hydrocarbon stream of pipe 105.

Moreover, it is important to note that any excess or desired portion of the normal butane in the pipe 101 may be conveyed by branch pipe 102 to the inlet line 82 of the isoparaffin synthesis reactor 80. The stream of normal butane thus supplied to the reactor is isomerized within the reaction zone, by the isoparaffin synthesis catalyst, to form additional isobutane for alkylation. In addition, any substantial proportion of normal butane so added tends to suppress the overall formation of paraffin hydrocarbons in this stage, thereby permitting the net production of normal butane to be held at a level approximating the actual requirements of the final motor gasoline. The embodiment of Figure 1 may be similarly modified.

The foregoing embodiment accordingly directs unaltered wet tail gas from the isoparaffin synthesis step to the secondary reaction zone, subject to the controls indicated, whereby the contained isoparaffins, carbon dioxide and hydrogen limit normal gaseous paraffin production therein, and the carbon dioxide formed by the isoparaffin synthesis step is consumed in increasing the yield of liquid hydrocarbons.

In accordance with one specific example, a synthesis gas containing essentially hydrogen and carbon monoxide in approximately the molar ratio of 1.5:1 is passed through a primary reaction zone containing fluidized alumina-thoria catalyst, containing about 20% alumina and about 80% thoria, at a pressure of about 300 atmospheres and a temperature of about 805° F. The gasiform reaction products are removed from contact with the catalyst, reduced in pressure to about 200 pounds per square inch guage, and the stream condensed and separated at about 70° F. with the recovery of a liquid product essentially in the motor gasoline boiling range. $C_4$ fractions are recovered from this gas, and the residue passed to a secondary reaction zone containing a fluidized iron catalyst promoted with alumina and potassium oxide at a pressure of about 200 pounds per square inch gauge, and at a temperature of about 600° F. This stream is admixed with additional fresh synthesis gas in the ratio of about one part of synthesis gas to two parts of tail gas from the primary reaction zone.

The withdrawn gasiform reaction products from the secondary reactor are similarly condensed and separated with the recovery of an additional stream of essentially motor gasoline fractions. The separated gases are recycled to the secondary reaction zone at a recycle rate of about 2:1 on the basis of admixed synthesis gas. The unrecycled portion is treated for the recovery of $C_4$ hydrocarbons and this stream, combined with the other $C_4$ hydrocarbon stream is fractionated for the removal of normal butane and then supplied directly to an alkylation system for the production of a high grade alkylate.

The composition of the combined feed to the secondary reaction zone, excluding recycle, is substantially free of water vapor and contains hydrogen and carbon monoxide in the molar ratio substantially in excess of 3:1, and slightly under 40 mol percent of carbon dioxide on the basis of the total reactant content.

The carbon dioxide supplied to the secondary reaction zone is largely consumed in the production of additional liquid hydrocarbons.

It is to be noted that the isoparaffin synthesis reaction operates best at relatively low fresh feed ratios of hydrogen to carbon monoxide in the neighborhood of about 1:1 to about 1.5:1, preferably about 1.2:1. On the other hand, the secondary reactor is most advantageously operated with a synthesis gas containing hydrogen and carbon monoxide in a ratio greater than about 2:1. As clearly shown above the present invention affords an excess of hydrogen, typical of the first reaction, to supplement the feed to the second reactor, thus permitting use of a common supply of synthesis gas which is relatively low in hydrogen. In short an overall ratio of less than about 2:1 in the fresh feed may be satisfactory.

On the other hand, an $H_2:CO$ ratio of 2:1 or greater in the fresh feed to the second reactor may result in better consumption of $CO_2$, and the process is therefor even better controlled where separate feeds of synthesis gas are available, namely, a relatively low ratio of carbon monoxide to the first reactor and a higher one for the second.

While the isoparaffin synthesis catalyst has been hitherto mentioned in terms of the alumina-thoria, or the zinc oxide-alumina complexes, the present invention contemplates the substitution of any suitable catalyst active for the production of a largely isoparaffinic hydrocarbon product, particularly one wherein the major portion of the $C_4$ hydrocarbons is in the form of isobutane. Therefor, other catalysts may be employed wherein the thoria or zinc oxide, above, are substituted by other suitable material capable of effecting the catalytic production of hydrocarbons, such for example as zirconia, molybdenum oxide and the oxides of ruthenium, and others of the transition elements.

The invention, moreover, contemplates use of mixtures of hydrocarbon synthesis catalysts with typical butane isomerization catalysts which are effective to isomerize butane under the pressure and temperature conditions at which the synthesis catalyst is also effective to synthesize hydrocarbons by the reduction of carbon monoxide with hydrogen; in short, where the synthesis catalyst effects hydrocarbon formation and the isomerizing catalyst effects concurrent isomerization to isoparaffins at the same temperature and pressure. The isomerizing catalysts which may be employed in this connection are either synthetic or natural materials, such as diatomaceous earth, silica gel, magnesium silicates, aluminum silicates, activated alumina, bauxite, bentonite, and may others, and may be promoted with boron oxide, silicon oxide of hydrofluoric acid. These may be effective with catalysts such as thoria and zinc oxide referred to above. They are also effective as isomerization catalysts at synthesis temperatures below the temperature at which cracking proceeds at a substantial rate and within the range where hydrocarbon synthesis catalysts are effective to cause the reduction of carbon monoxide by hydrogen with the production of hydrocarbons. Therefor with such combinations, the hydrocarbon synthesis catalyst, may include typical catalysts such as cobalt, nickel, or iron.

Obviously many modifications and variations of the invention as hereinbefore set forth, may be made without departing from the spirit and scope thereof, and therefore only such limitations should be imposed as are indicated in the appended claims.

I claim:

1. In the production of hydrocarbons of high antidetonation characteristics by the catalytic treatment of a synthesis gas comprising essentially hydrogen and carbon monoxide, the steps which comprise passing individual streams of said synthesis gas respectively through separate first and second reaction zones, said first reaction zone being maintained at a temperature in the range of about 750–900° F., and a pressure from about 50–500 atmospheres, and containing a metal oxide isoparaffin synthesis catalyst effective under said reaction conditions to convert said reactants into predominantly ispraffinc hydrocarbons with the formation of substantial quantities of by-product carbon dioxide, the second reaction zone being maintained at a temperature in the range of about 550–700° F., and an elevated pressure substantially below the range prevailing in the first reaction zone, and containing an iron type hydrocarbon synthesis catalyst effective under said reaction conditions to convert synthesis gas into predominantly olefinic hydrocarbons, effecting a substantial conversion of the synthesis gas fed to the first reaction zone, withdrawing therefrom the effluent product stream, recovering from the withdrawn stream desired hydrocarbon fractions and included water vapor, and injecting residual hydrogen and by-product carbon dioxide into the synthesis gas feed to the second reaction zone to form a gaseous feed mixture containing $H_2$ and CO in a molar ratio above about 2:1, and a $CO_2$ content sufficient to direct the water-gas shift reaction in that direction which consumes $CO_2$ and $H_2$ to form a substantial quantity of additional CO at the temperature prevailing therein, effecting substantially complete conversion of CO in the second reaction zone into desired products of reaction and reacting isoparaffins from the effluent product stream of the first reaction zone with olefins from the effluent product stream of the second reaction zone to form liquid alkylate.

2. The method according to claim 1 wherein said metal oxide isoparaffin synthesis catalyst comprises alumina and thoria.

3. The method according to claim 1 wherein said metal oxide isoparaffin synthesis catalyst comprises zinc oxide and alumina.

4. The method according to claim 1 wherein the stream of synthesis gas supplied to the first reaction zone contains $H_2$ and CO in a molar ratio below about 2:1.

5. The method according to claim 1 wherein the stream of synthesis gas supplied to the first reaction zone contains $H_2$ and CO in a molar ratio within the range of about 1:1 to about 1.5:1.

6. The method according to claim 1 wherein the streams of synthesis gas supplied to both the first and second reaction zones contain $H_2$ and CO in a molar ratio below 2:1 and wherein the total feed to the second reaction zone, after injection of said residual hydrogen and by-product carbon dioxide, contains $H_2$ and CO in a molar ratio substantially above 2:1.

7. The method according to claim 1 wherein normal paraffinic hydrocarbons from the effluent products are recycled to the first reaction zone to effect substantial isomerization thereof.

8. In the production of hydrocarbons of high antidetonation characteristics, in the catalytic hydrogenation of carbon monoxide, the steps which comprise simultaneously passing individual streams of synthesis gas comprising hydrogen and carbon monoxide in the molar ratio less than about 2:1 through separate first and second reaction zones, said first reaction zone being maintained at a temperature in the range of about 750–900° F. and a pressure from about 50–500 atmospheres, and containing a metal oxide, isoparaffin synthesis catalyst effective under such conditions to convert said reactants into an effluent product stream containing predominantly isoparaffinic hydrocarbons and substantial quantities of carbon dioxide and hydrogen, the second reaction zone being maintained in the range of about 550–700° F. and an elevated pressure, substantially below the range prevailing in the first reaction zone and containing an iron type hydrocarbon synthesis catalyst effective under said reaction conditions to convert the reactants into an effluent product stream containing predominantly olefinic hydrocarbons, withdrawing the effluent product stream from contact with the catalyst in the first reaction zone, recovering desired hydrocarbon fractions and included water vapor therefrom, and injecting residual hydrogen and byproduct carbon dioxide into the synthesis gas feed to the second reaction zone to form a gaseous feed mixture containing hydrogen and carbon monoxide in a molar ratio above about 2:1 and a carbon dioxide content sufficient to direct the water-gas shift reaction in that direction which consumes carbon dioxide and hydrogen to form a substantial quantity of additional carbon monoxide at the temperature prevailing therein, effecting substantially complete conversion of carbon monoxide in the second reaction zone into said desired products of reaction, and reacting isobutane fractions from the hydrocarbon product of the first reaction zone with olefins from the hydrocarbon product of the second reaction zone to form liquid alkylate.

9. In the production of hydrocarbons of high antidetonation characteristics by the catalytic treatment of a synthesis gas comprising essentially hydrogen and carbon monoxide, the steps which comprise passing individual streams of said synthesis gas respectively through separate first and second reaction zones, said first reaction zone being maintained at a temperature in the range of about 750–900° F., and a pressure from about 50–500 atmospheres, and containing a metal oxide, isoparaffin synthesis catalyst effective under said reaction conditions to convert said reactants into predominantly isoparaffinic hydrocarbons with the formation of substantial quantities of by-product carbon dioxide, the second reaction zone being maintained at a temperature in the range of about 550–700° F., and an elevated pressure substantially below the range prevailing in the first reaction zone, and containing an iron type hydrocarbon synthesis catalyst effective under said reaction conditions to convert synthesis gas into predominantly olefinic hydrocarbons, effecting a substantial conversion of the synthesis gas fed to the first reaction zone, withdrawing therefrom the effluent product stream, recovering from the withdrawn stream desired hydrocarbon fractions and included water vapor, and injecting residual hydrogen and by-product carbon dioxide into the synthesis gas feed to the second reaction zone to form a gaseous feed mixture containing $H_2$ and CO in a molar ratio above about 2:1, and a $CO_2$ content sufficient to direct the water-gas shift reaction in that direction which consumes $CO_2$ and $H_2$ to form a substantial quantity of additional CO at the temperature prevailing therein, effecting substantially complete conversion of CO in the second reaction zone into desired products of reaction and recovering desired hydrocarbons from the effluent product stream thereof.

JAMES H. GRAHAME.

REFERENCES CITED

The following references are of record in the file of this patent:

UNITED STATES PATENTS

| Number | Name | Date |
|---|---|---|
| 1,798,288 | Wietzel et al. | Mar. 31, 1931 |
| 2,224,048 | Herbert | Dec. 3, 1940 |
| 2,253,607 | Boyd et al. | Aug. 26, 1941 |
| 2,257,074 | Goldsby | Sept. 23, 1941 |
| 2,257,293 | Dreyfus | Sept. 30, 1941 |
| 2,286,814 | Kemp | June 16, 1942 |
| 2,347,682 | Gunness | May 2, 1944 |
| 2,360,463 | Arveson | Oct. 17, 1944 |
| 2,417,164 | Huber | Mar. 11, 1947 |
| 2,436,957 | Eastman | Mar. 2, 1948 |

OTHER REFERENCES

Article in "The Oil and Gas Journal," of January 19, 1946, pages 86 and 89.